(12) United States Patent
Wagoner et al.

(10) Patent No.: US 9,537,437 B2
(45) Date of Patent: Jan. 3, 2017

(54) METHOD AND SYSTEM FOR CONTROLLING SWITCHING FREQUENCY OF A DOUBLY-FED INDUCTION GENERATOR (DFIG)

(71) Applicant: General Electric Company, Schenectady, NY (US)

(72) Inventors: Robert Gregory Wagoner, Roanoke, VA (US); David Smith, Daleville, VA (US)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 13/783,449

(22) Filed: Mar. 4, 2013

(65) Prior Publication Data
US 2014/0247021 A1 Sep. 4, 2014

(51) Int. Cl.
*H02P 9/00* (2006.01)
*H02J 3/38* (2006.01)

(52) U.S. Cl.
CPC .............. *H02P 9/007* (2013.01); *H02J 3/386* (2013.01); *Y02E 10/763* (2013.01)

(58) Field of Classification Search
CPC ................................. H02J 3/386; H02P 9/007
USPC .......................................................... 322/47
See application file for complete search history.

(56) References Cited

U.S. PATENT DOCUMENTS

| | | | |
|---|---|---|---|
| 4,158,801 A * | 6/1979 | Hirata | 318/801 |
| 5,070,440 A | 12/1991 | Walker | |
| 6,545,450 B1 | 4/2003 | Ledenev et al. | |
| 6,751,106 B2 | 6/2004 | Zhang et al. | |
| 7,423,412 B2 | 9/2008 | Weng et al. | |
| 7,446,435 B2 | 11/2008 | Zhang et al. | |
| 7,643,318 B2 | 1/2010 | Wagoner | |
| 7,852,643 B2 * | 12/2010 | Zhang et al. | 363/65 |
| 7,876,191 B2 | 1/2011 | Chandrasekaran et al. | |
| 7,928,592 B2 | 4/2011 | Wagoner et al. | |
| 7,939,959 B2 * | 5/2011 | Wagoner et al. | 290/55 |
| 7,944,068 B2 | 5/2011 | Wagoner et al. | |
| 8,138,620 B2 * | 3/2012 | Wagoner et al. | 290/44 |
| 8,270,191 B2 | 9/2012 | Zhu et al. | |
| 8,310,074 B2 | 11/2012 | Larsen et al. | |
| 2004/0233690 A1 | 11/2004 | Ledenev et al. | |
| 2007/0052244 A1 | 3/2007 | Hudson | |

(Continued)

OTHER PUBLICATIONS

Schroder et al. "Modular High-Power Shunt-Interleaved Drive System: A Realization up to 35 MW for Oil and Gas Applications," IEEE Transactions on Industry Applications, vol. 46, No. 2, Mar./Apr. 2010, pp. 821-830.

*Primary Examiner* — Tulsidas C Patel
*Assistant Examiner* — Viet Nguyen
(74) *Attorney, Agent, or Firm* — Dority & Manning, P.A.

(57) ABSTRACT

The present subject matter is directed to systems and methods for controlling variable speed generators, particularly converters associated with doubly-fed induction generators (DFIG) to permit use of harmonic attenuating filters that are generally smaller and less costly than previous similar filters. The subject matter provides for controlling line-side and rotor-side converters in such a manner that the frequencies generated by the converters are interleaved in a manner that the filters see a higher switching frequency and thus may be designed based on those higher frequencies, thereby requiring smaller and less expensive components.

4 Claims, 5 Drawing Sheets

(56) References Cited

U.S. PATENT DOCUMENTS

| | | | |
|---|---|---|---|
| 2007/0121353 A1* | 5/2007 | Zhang et al. | 363/39 |
| 2008/0054874 A1 | 3/2008 | Chandrasekaran et al. | |
| 2008/0239775 A1* | 10/2008 | Oughton et al. | 363/134 |
| 2010/0156192 A1* | 6/2010 | Wang | H02J 3/01 307/82 |
| 2010/0164428 A1* | 7/2010 | Xu et al. | 318/767 |
| 2010/0254168 A1 | 10/2010 | Chandrasekaran | |
| 2011/0133563 A1* | 6/2011 | Barton | H02J 3/386 307/84 |
| 2011/0299311 A1 | 12/2011 | Zhu et al. | |
| 2012/0081934 A1* | 4/2012 | Garrity et al. | 363/37 |
| 2012/0134189 A1 | 5/2012 | Krein | |
| 2012/0136494 A1 | 5/2012 | Kirchner et al. | |
| 2012/0155125 A1* | 6/2012 | Zhang | H02M 1/44 363/34 |
| 2013/0003424 A1* | 1/2013 | Song et al. | 363/21.04 |
| 2013/0076143 A1* | 3/2013 | Guo | H02J 9/04 307/66 |
| 2013/0134710 A1* | 5/2013 | Yuan et al. | 290/44 |
| 2013/0229842 A1* | 9/2013 | Garrity | 363/95 |
| 2013/0294126 A1* | 11/2013 | Garrity et al. | 363/95 |
| 2014/0049859 A1* | 2/2014 | Wagoner | H02J 3/00 361/18 |

\* cited by examiner

METHOD AND SYSTEM FOR CONTROLLING SWITCHING FREQUENCY OF A DOUBLY-FED INDUCTION GENERATOR (DFIG)

FIELD OF THE INVENTION

The present subject matter relates generally to the field of power generation systems, and more particularly to a system and method for controlling variable speed generators coupled to a power distribution grid.

BACKGROUND OF THE INVENTION

Power generation systems generate electrical power from various sources including hydropower, wind power, and from the combustion of fuels such as coal, oil and gas. These sources are harnessed to rotate prime movers, typically engines or turbines, that are coupled to power generators, which are in turn coupled to various loads via, for example, a power distribution grid ("grid").

Such power generation systems employ generators that generally produce electrical power that is proportional in frequency to the rotational speed of a generator, for example, a turbine. Thus, changes in turbine speed may result in changes to the frequency of power generated. Accordingly, the rotational speed of the turbine should be regulated to produce a frequency that matches the requirements of the grid. In situations where the turbine speed has been changed relative to the required grid frequency, or is not sufficient to produce the required frequency, measures must be taken to modulate the generator output frequency to match the grid frequency.

A number of the prior art techniques have been proposed to compensate for changing turbine speeds. These techniques include controlling mechanical variables such as fuel flow rate to regulate turbine rotational speed and using multi-shaft configurations. In addition, various power conversion schemes have been used where power converters are coupled to the output of the generation system.

With present reference to FIG. 1, there is illustrated a block diagram of an exemplary conventional power converter system 100 utilizing a Doubly-Fed Induction Generator (DFIG) converter 102 including a line side converter 104 and a rotor side converter 106 both operating under control of controller 120. Existing DFIG converters generate harmonics from both the line-side converter 104 and rotor-side converter 106. Harmonics generated from the rotor-side converter 106 are feed through DFIG generator 108 and are added together with harmonics of the line-side converter 104, with these combined harmonics feed into the grid 110. Since regulators place limitations on harmonics coupled to the grid, an LRC filter 112 is generally required to be built into the line-side converter 104 to attenuate these harmonics to meet the grid codes. The physical size and cost of producing such filters is significant.

With reference to FIG. 2, there is illustrated a block diagram of an exemplary conventional power converter system 200 utilizing a DFIG converter 202 in association with a three-winding main transformer 216. Inclusion of three-winding main transformer 216 allows operation of the stator of DFIG 208 at a different voltage from the converter 202. As previously noted with respect to FIG. 1, existing DFIG converters generate harmonics from both the rotor and the line side converters. In the instance illustrated in FIG. 2, the three-winding transformer 216 separates the converter line-side filter 212 from the stator by so much impedance that a very large filter 214 must also be added to the stator side. The size and cost of this filter is also significant.

In view of these known issues, it would be advantageous, therefore, to develop systems and methods that would permit reducing component size and related costs for such filters.

BRIEF DESCRIPTION OF THE INVENTION

Aspects and advantages of the subject matter will be set forth in part in the following description, or may be obvious from the description, or may be learned through practice of the subject matter.

The present subject matter relates to methodologies for operating a doubly-fed induction generator (DFIG) having controllable line-side and rotor-side converters and at least one harmonic attenuating filter. According to one such method, switching of the line-side converter is coordinated with switching of the rotor-side converter to produce an interleaved switching pattern therebetween. In this manner, the switching frequency seen by the harmonic attenuating filter is effectively increased, as compared for example to a non-interleaved switching pattern, and the resulting are more easily attenuated by the filter.

The present subject matter also relates to a doubly-fed induction generator (DFIG) system. Such system includes a DFIG having a stator bus and a rotor bus, a line-side converter coupled to the stator bus by way of a line bus, a rotor-side converter coupled to the line side converter and the rotor bus, a controller coupled to the line-side converter and the rotor-side converter, and at least one harmonic attenuating filter. In such system, the line bus and stator bus are configured to be coupled to a power distribution grid, the at least one harmonic attenuation filter is configured to attenuate harmonics applied to the power distribution grid, and the controller is configured to coordinating switching of the line-side converter with switching of the rotor-side converter to produce an interleaved switching pattern therebetween.

The present subject matter further relates to a method for reducing harmonic attenuation filter size requirements in a doubly-fed induction generator (DFIG) system. In accordance with the present disclosure, such method provides for coordinating switching of a line-side converter with switching of a rotor-side converter in a DFIG to produce an interleaved switching pattern therebetween and configuring at least one associated harmonic attenuating filter to attenuate harmonics based on an effectively increased switching frequency produced from the interleaved switching pattern. In this manner, filters may be constructed based on operation at the higher frequency thereby requiring physically smaller and, consequently, less expensive components.

These and other features, aspects and advantages of the present subject matter will become better understood with reference to the following description and appended claims. The accompanying drawings, which are incorporated in and constitute a part of this specification, illustrate embodiments of the subject matter and, together with the description, serve to explain the principles of the subject matter.

BRIEF DESCRIPTION OF THE DRAWINGS

A full and enabling disclosure of the present subject matter, including the best mode thereof, directed to one of ordinary skill in the art is set forth in the specification, which makes reference to the appended figures, in which.

Figure 1:
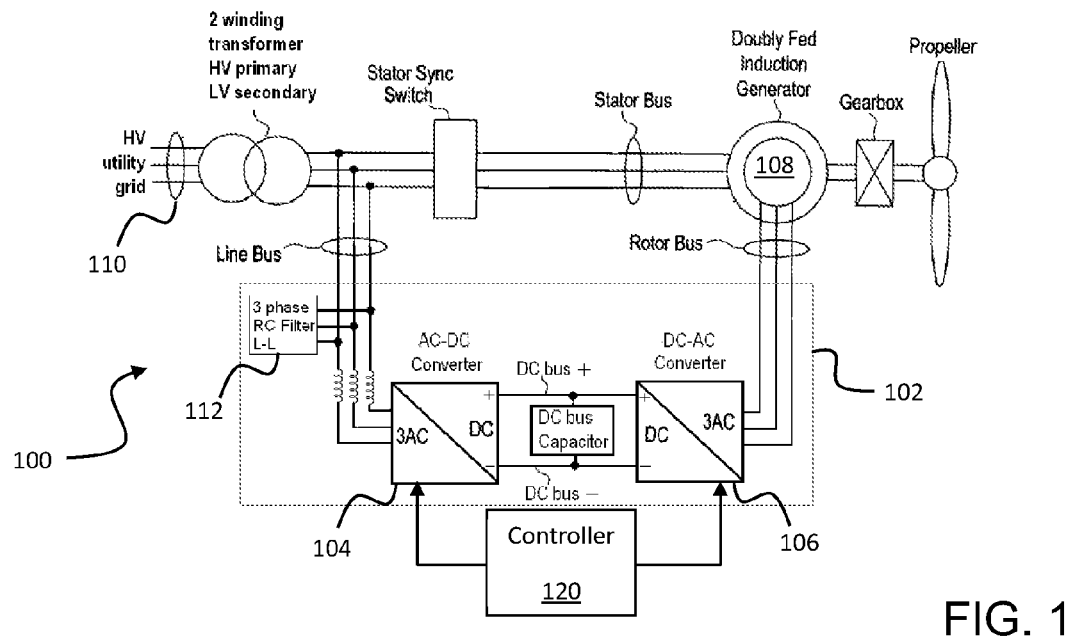
FIG. 1 depicts a DFIG Wind Turbine System with single secondary voltage and illustrating Line AC-DC Converter and Rotor DC-AC Converter.
Figure 2:
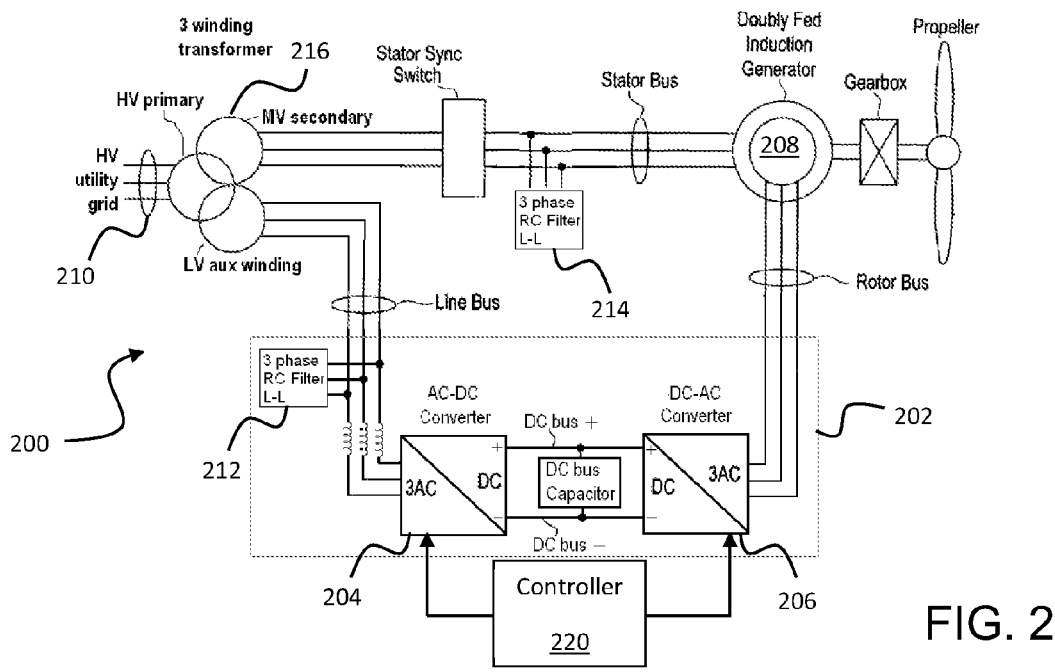
FIG. 2 depicts a DFIG Wind Turbine System with three-winding main transformer and illustrating Line AC-DC Converter and Rotor DC-AC Converter.

Repeat use of reference characters throughout the present specification and appended drawings is intended to represent same or analogous features or elements of the invention.

DETAILED DESCRIPTION OF THE INVENTION

As discussed in the Summary of the Subject Matter section, the present subject matter is particularly concerned with methods and systems for controlling variable speed generators coupled to a power distribution grid.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In accordance with the present subject matter, it has been found that the switching frequency of the line side converter 104, 204 can be coordinated with (synchronized to) the switching frequency on the rotor side converter 106, 206 in a way that the frequencies sum together at the grid node 110, 210 in opposite phasing. Such a technique may be described as interleaving. Such interleaving increases the effective switching frequency seen by the filters 112, 212, 214, and thereby permits reduction in the physical size of the filters while at the same time permitting considerable reduction in the cost associated with producing such filters.

This type operation has not been previously employed on DFIG converters. In one aspect, such coordination between the line side and rotor side converters is more complex than ordinary converters because of the rotational frequency and phase shift caused by the generator. In accordance with the present subject matter, controllers 120, 220 are configured to provide a continuously variable offset in the line chopping phase relative to the rotor chopping phase to keep up with the slip frequency. More particularly, the present subject matter provides for creating an arbitrary offset in chopping phase angle of the line-side converter 104, 204 in order to shift the phase dynamically through the PWM frame. This offset allows synchronizing the switching frequency of the line-side converter to a phase position which is interleaved to have opposite polarity with the rotor-side converter 106, 206 at the grid node 110, 210.

In other words, as the ripple current from the line-side converter 104, 204 is increasing, the ripple current from the rotor-side converter 106, 206 is decreasing. In this manner the frequencies from each converter tend to cancel at the grid node 110, 210. In order for this operation to work properly, the rotor and line switching frequencies are closely synchronized together, differing only by the frequency offset provided by controller 120, 220 as the rotor rotational frequency is adjusted as it goes through the generator.

Figure 3:
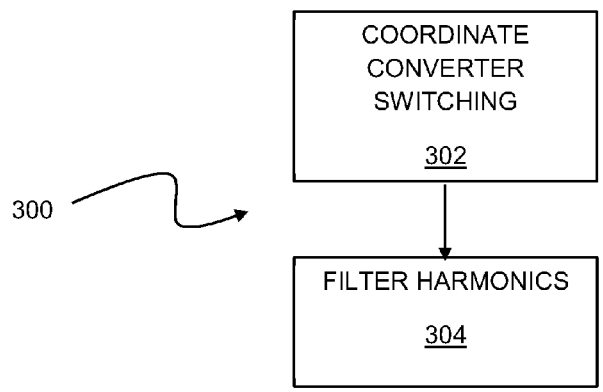
FIG. 3 is a flow chart illustrating methodology for controlling a DFIG in accordance with the present subject matter.

With present reference to FIG. 3, there is illustrated a flow chart 300 illustrating operation of a DFIG in accordance with the present subject matter. As illustrated in FIG. 3, a first step (step 302) in accordance with the present subject matter is to coordinate the switching of the line-side and rotor-side converters associated with a DFIG. As previously noted, such coordination may involve the synchronization of the switching of the converters in a manner that produces interleaving of the switching frequencies. Such interleaving results in a higher frequency being seen by, that is, applied to harmonic filters associated with the DFIG. Because of the generation of the higher frequencies by the combining of the switching frequencies (as compared to non-interleaved switching of the converters), smaller capacity components may be used for forming the harmonic filters, thereby providing significant cost savings.

Further with reference to FIG. 3, at step 304 harmonics are filtered from the combined switching signals by employing the reduced size filters made possible by the higher switching frequency applied to the filters.

Figure 4:
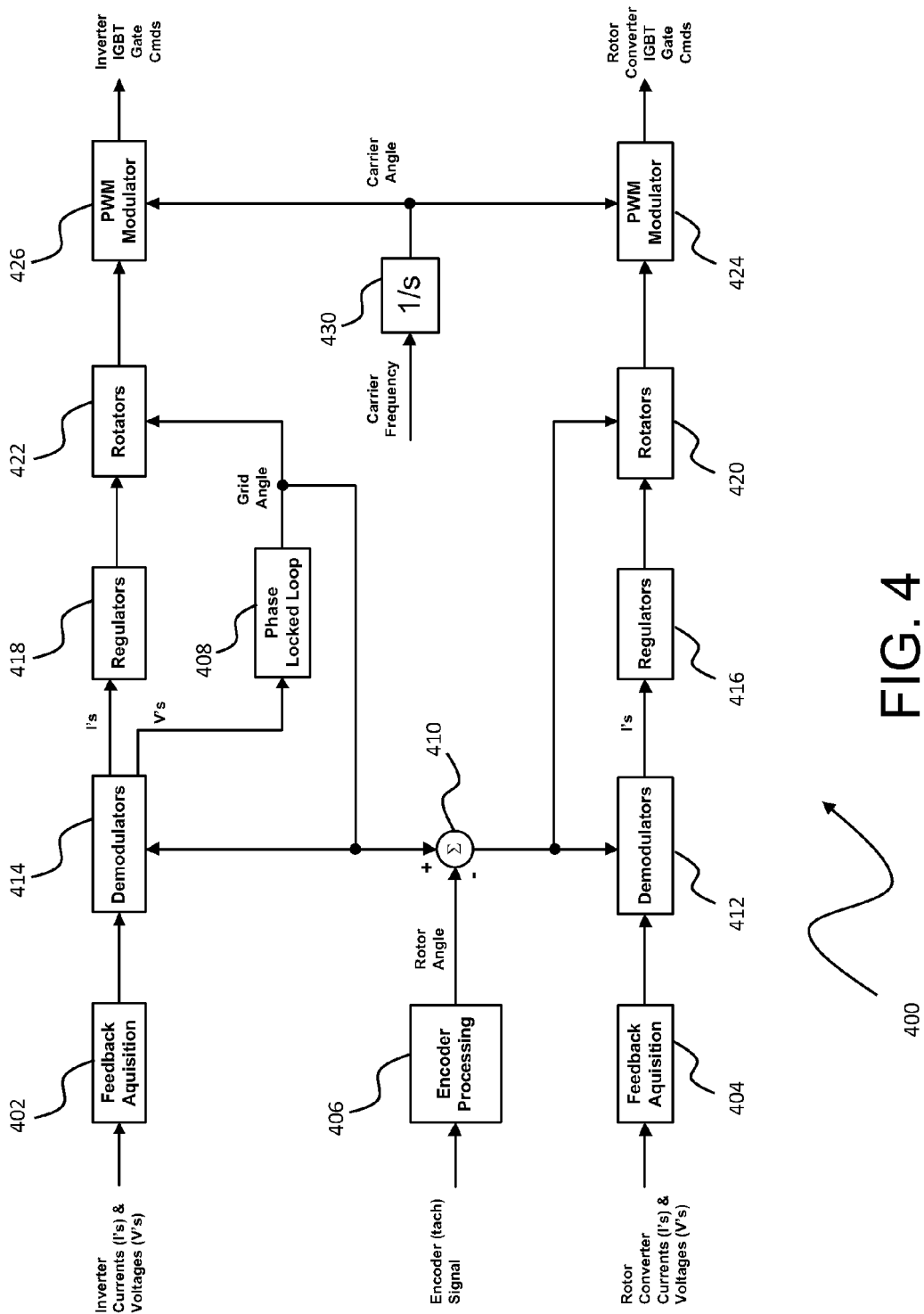
FIG. 4 is a block diagram illustrating an overview of a conventional DFIG control system.

With present reference to FIG. 4, there is illustrated a block diagram 400 illustrating an overview of a conventional DFIG control system. As illustrated, input signals from both inverter and rotor currents and voltages are monitored by way of respective feedback acquisition circuits 402, 404 while encoder 406 processes a speed signal to produce a signal indicative of rotor angle. The rotor angle signal is combined with a grid angle signal from phase locked loop 408 in adder 410 and applied to demodulators 412 associated with the rotor converter while only the grid angle signal is applied to the demodulators 414 associated with the inverter.

The combined signals are then applied from demodulators 412, 414, respectively through regulators 416, 418 and rotators 420, 422 to pulse width modulators (PWM) 424, 426 as one input to each modulator. A second input to PWMs 424, 426 is based on a carrier angle signal derived from a carrier frequency signal via integrator 430. The outputs of modulators 424, 426 are then, respectively, applied to the rotor converter and the inverter. All such operations with respect to block diagram 400 are in accordance with known practices.

Figure 5:
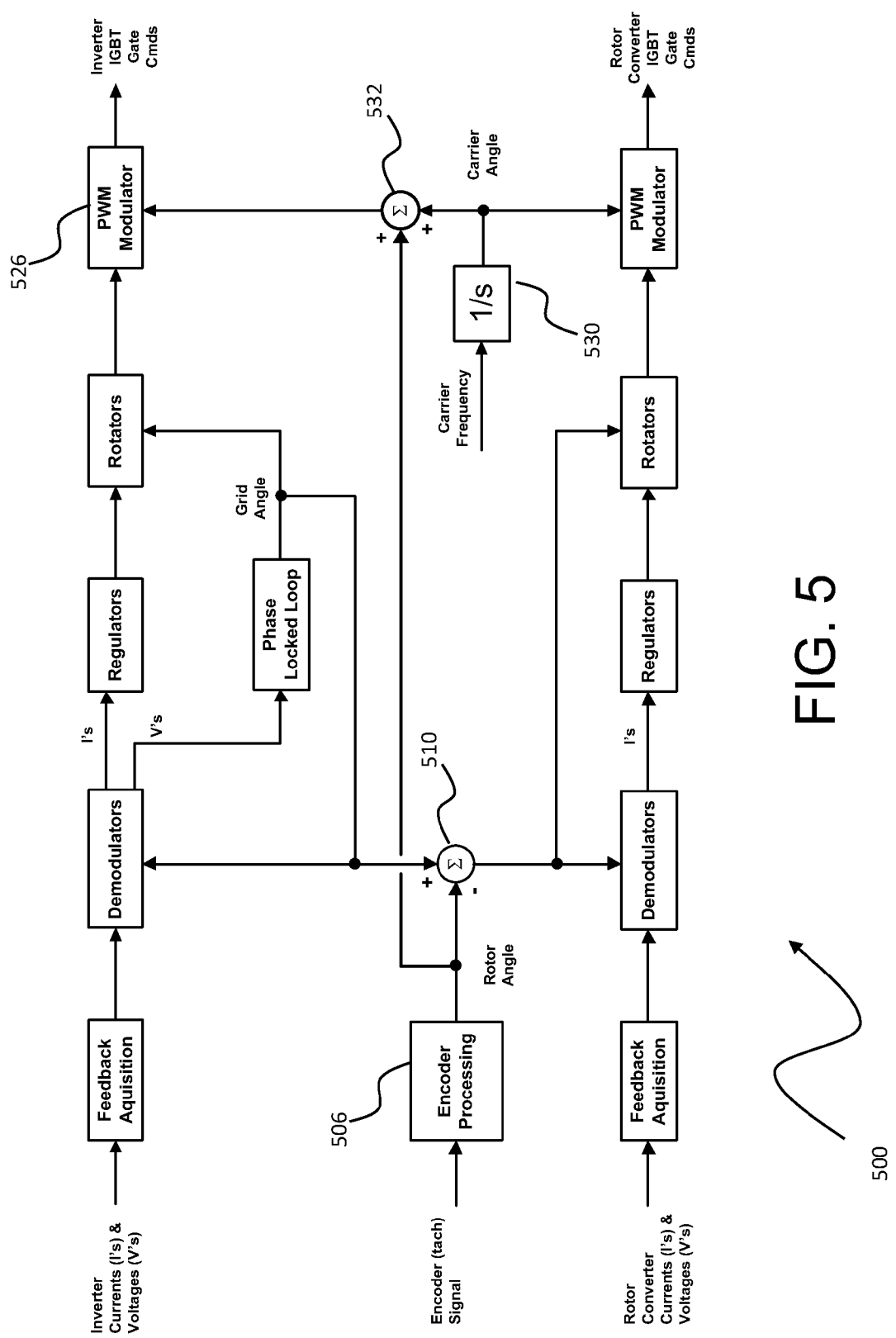
FIG. 5 is a block diagram illustrating an overview of a DFIG control system in accordance with a first embodiment of the presently disclosed subject matter.

With present reference to FIG. 5, there is illustrated a block diagram 500 of a DFIG control system in accordance with a first embodiment of the presently disclosed subject matter. As illustrated in FIG. 5, the elements described with respect to FIG. 4 are also present in FIG. 5 and function in exactly the same manner as described with respect to FIG. 4 and will, therefore, not be further described herein. With reference however to the presently disclosed subject matter, it will be appreciated that the rotor angle output from encoder 506, per present disclosure, is not only applied to adder 510 in the same manner as described with respect to FIG. 4, but also is supplied as one of the inputs to adder 532 where such rotor angle signals is added to the carrier angle signal from integrator 530 and applied to modulator 526 associated with the inverter.

Figure 6:
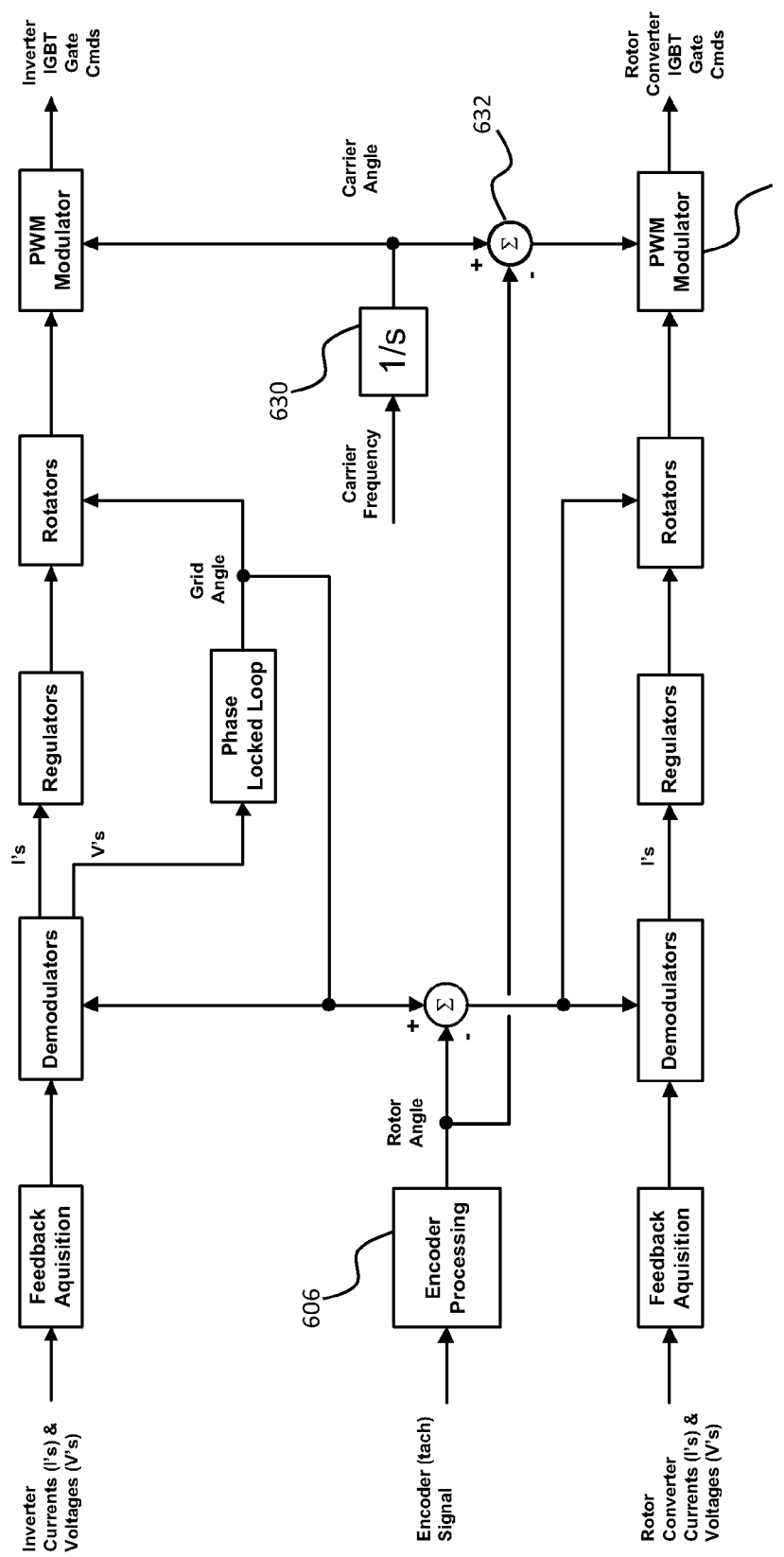
FIG. 6 is a block diagram illustrating an overview of a DFIG control system in accordance with a second embodiment of the presently disclosed subject matter.

With present reference to FIG. 6, there is illustrated a block diagram 600 of a DFIG control system in accordance with a second embodiment of the presently disclosed subject matter. As will be see from a comparison with FIG. 5, this second embodiment is identical in every way to the first embodiment except that the rotor angle signal from encoder 606 is subtracted from the carrier angle signal from integrator 630 in adder 632 and then applied to modulator 624 associated with the rotor converter. The result of such operation may be seen with reference to FIG. 7.

Figure 7:
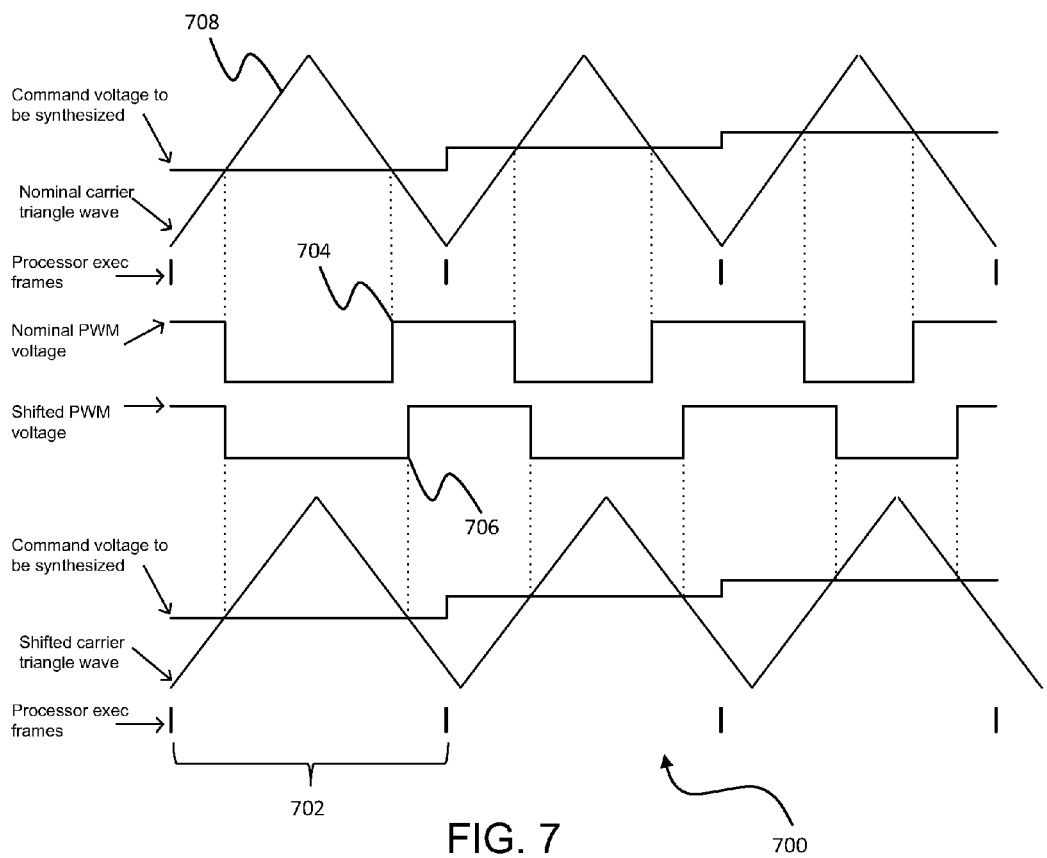
FIG. 7 is a chart illustrating exemplary waveforms associated with the overview illustrated in FIG. 6.

With present reference to FIG. 7, there is shown a chart 700 illustrating exemplary waveforms associated with the overview illustrated in FIG. 6. As may be seen in FIG. 7, during each processor execution frame, representatively, frame 702, a nominal PWM voltage 704 may be shifted as illustrated at voltage trace 706 by shifting the normal triangular carrier wave 708 by operation of the combination of rotor angle signal and carrier angle signal in adder 632 as described with reference to FIG. 6. Such combination results in the shifted PWM voltage 706 that is then applied to the rotor converter. Operation in this manner results in the interleaving of the switching frequencies as previously described with reference to FIG. 3 and produces the higher frequency harmonics that may then be filtered using the reduced physical sized and less costly filters previously described with respect to FIG. 1.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for operating a doubly-fed induction generator (DFIG) having controllable line-side and rotor-side converters and at least one harmonic attenuating filter, comprising:

coordinating switching of the line-side converter with switching of the rotor-side converter such that a frequency of switching of the line-side converter differs from a frequency of switching of the rotor-side converter by a frequency offset to produce an interleaved switching pattern between the line-side converter and the rotor-side converter; and wherein the interleaved switching pattern produces an effective increased switching frequency applied to the associated harmonic attenuating filter;

wherein the frequency offset is determined based at least in part on a rotor rotational frequency of the doubly-fed induction generator.

2. A method as in claim 1, wherein switching is coordinated so that the switching of the line-side converter and rotor-side converter are in opposite phasing.

3. A doubly-fed induction generator (DFIG) system, comprising:

a DFIG having a stator bus and a rotor bus;

a line-side converter coupled to said stator bus by way of a line bus;

a rotor-side converter coupled to said line side converter and said rotor bus;

a controller coupled to said line-side converter and said rotor-side converter; and, at least one harmonic attenuating filter, wherein said line bus and stator bus are configured to be coupled to a power distribution grid, said at least one harmonic attenuation filter is configured to attenuate harmonics applied to the power distribution grid, and wherein said controller is configured to coordinate switching of the line-side converter with switching of the rotor-side converter such that a frequency of switching of the line-side converter differs from a frequency of switching of the rotor-side converter by a frequency offset to produce an interleaved switching pattern between the line-side converter and the rotor-side converter;

wherein the frequency offset is determined based at least in part on a rotor rotational frequency of the doubly-fed induction generator.

4. A system as in claim 3, wherein said controller is configured to coordinate switching so that the switching of the line-side converter and rotor-side converter are in opposite phasing.

* * * * *